Patented Apr. 14, 1936

2,037,229

UNITED STATES PATENT OFFICE 2,037,229

PRODUCTION OF SULPHONIC ACIDS

Fritz Günther and Josef Hetzer, Ludwigshafen-on-the-Rhine, Germany, assignors to I. G. Farbenindustrie Aktiengesellschaft, Frankfort-on-the-Main, Germany, a corporation of Germany No Drawing. Application June 5, 1928, Serial No. 283,128. In Germany June 22, 1927

16 Claims. (Cl. 260—159)

The present invention relates to the production of sulphonic acids.

We have found that organic compounds, which contain one or more double or triple bonds in the molecule, namely olefinic aliphatic hydrocarbons or halogen derivatives thereof and mono-nuclear cyclo-aliphatic compounds which in the following and in the claims will be referred to as olefinic, non-aromatic compounds, can be converted, in a simple manner, into water soluble products containing sulphonic groups, by treating them with sulphonating agents, such as sulphuric acid, sulphuric anhydride, chlorsulphonic acid, or mixtures of the same, in the presence of other inorganic or organic acids, their anhydrides or chlorides such as phosphorus pentoxid or oxychloride acetic acid, acetic anhydride, acetyl chloride and the like, which will be referred to in the following and in the claims as acid catalysts. In many instances the mixing together of these substances results in the formation of mixed anhydrides, such as acetylsulphuric acid and the like (see Beilstein, 4th edition Vol. II, p. 168, lines 1 to 3).

According to this manner of working, unsaturated aliphatic hydrocarbons, such as propylene or the higher homologues thereof, butadiene, and especially such substances as, for example, the non-aromatic hydrocarbons of petroleum, brown-coal tar-oils, such as gas oils, yellow oils, solar oils and the like; or the gaseous or liquid products resulting from the cracking of petroleum, tar oils and the like, may be employed for the production of water soluble compounds as they are or after enriching or isolating their olefinic constituents. The products obtained are distinguished by a high power of resisting the action of acids, and of which in particular the members of high molecular weight are excellently suitable for application either alone or in admixture with other substances as wetting, emulsifying, cleaning or dispersing agents, or as solvents also in acid solutions. The salts of the said substances also exhibit these properties.

The following examples will further illustrate the nature of the said invention which however is not limited thereto. The parts are by weight.

Example 1

82 parts of tetrahydrobenzene are introduced, while stirring and cooling, into a mixture of 102 parts of acetic anhydride and 100 parts of sulphuric acid monohydrate, prepared at about 10° C. The reaction will have been completed and the mass become soluble in water, at the end of a short time. The reaction product is diluted with water and acetic acid is driven off by means of steam, whereupon the residue is neutralized by means of caustic soda, the sodium salt of the sulphonation product being obtained which can be recrystallized from water. The product is stable against acids even on treatment in the warm.

In a similar manner derivatives of partly unsaturated cyclic compounds such as hydrobenzene carboxylic acids can be employed.

Example 2

100 parts of acetic anhydride are mixed with 100 parts of concentrated sulphuric acid, a rising of the temperature being carefully avoided, whereupon about 42 parts of propylene are introduced at room temperature and the whole is kept standing for some time at the same temperature. The reaction product is then worked up by diluting with water, boiling for some time under a reflux condenser and distilling off acetic acid. The sulphonated propylene can be recovered from the aqueous solution as salt by any usual method, for example by preparing the calcium salt by treatment with lime and converting the calcium salt into the sodium salt or, by neutralizing with caustic alkalis and recrystallization. In the place of propylene higher homologues thereof or natural or artificial oils containing these or halogenated derivatives of the said types of hydrocarbons, such as tri-chlorethylene and similar compounds can be employed.

What we claim is:—

1. The process of producing sulphonic acids which comprises reacting an olefinic non-aromatic compound with a sulphonating mixture containing a substantial amount of a mixed anhydride formed from a sulphonating agent and acetic anhydride, the two components of the mixed anhydride formed being applied in at least stoichiometrical amounts relative to the material to be sulphonated.

2. The process of producing sulphonic acids which comprises reacting an olefinic non-aromatic compound with a sulphonating mixture containing a substantial amount of a mixed anhydride formed from chlorosulphonic acid and acetic acid, the two components of the mixed anhydride formed being applied in at least stoichiometrical amounts relative to the material to be sulphonated.

3. The process of producing sulphonic acids which comprises reacting an olefinic non-aromatic compound with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated.

4. The process of producing sulphonic acids which comprises reacting an olefinic non-aromatic compound with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated, and the organic acid compound being selected from the group consisting of acetic acid, its anhydride and chloride.

5. The process of producing sulphonic acids which comprises reacting an olefinic non-aromatic compound containing halogen with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated.

6. The process of producing sulphonic acids which comprises reacting an olefinic non-aromatic compound containing halogen with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated, and the organic acid compound being selected from the class consisting of acetic acid, its anhydride and chloride.

7. The process of producing sulphonic acids which comprises reacting a mixture of olefinic non-aromatic compounds with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated.

8. The process of producing sulphonic acids which comprises reacting a mixture of olefinic non-aromatic compounds with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated, and the organic acid compound being selected from the class consisting of acetic acid, its anhydride and chloride.

9. The process of producing sulphonic acids which comprises reacting a mineral oil containing a material amount of olefinic hydrocarbons with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated.

10. The process of producing sulphonic acids which comprises reacting a mineral oil containing a material amount of olefinic hydrocarbons with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated.

11. The process of producing sulphonic acids which comprises reacting a fraction of a mineral oil comprising hydro-benzene carboxylic acids with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated.

12. The process of producing sulphonic acids which comprises reacting a fraction of a mineral oil comprising hydro-benzene carboxylic acids with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated, and the organic acid compound being selected from the class consisting of acetic acid, its anhydride and chloride.

13. The process of producing sulphonic acids which comprises reacting the liquid products containing olefinic non-aromatic compounds obtainable by cracking a fraction of mineral oils with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated.

14. The process of producing sulphonic acids which comprises reacting the liquid products containing olefinic non-aromatic compounds obtainable by cracking a fraction of mineral oils with a sulphonating mixture containing a substantial amount of a mixed anhydride formed from a sulphonating agent and an organic acid compound capable of yielding such anhydride with the sulphonating agent, the two components of the mixed anhydride formed being applied in at least stoichiometrical amounts relative to the material to be sulphonated, and the organic acid compound being selected from the class consisting of acetic acid, its anhydride and chloride.

15. The process of producing sulphonic acids which comprises reacting a fraction of a mineral oil containing a material amount of olefinic hydrocarbons with a sulphonating mixture containing a substantial amount of a mixed anhydride formed from a sulphonating agent and acetic anhydride, the two components of the mixed anhydride formed being applied in at least stoichiometrical amounts relative to the material to be sulphonated.

16. The process of producing sulphonic acids which comprises reacting a fraction of a mineral oil containing a material amount of olefinic hydrocarbons with a sulphonating mixture containing a substantial amount of a mixed anhydride formed from sulphuric acid and acetic anhydride, the two components of the mixed anhydride formed being applied in at least stoichiometrical amounts relative to the material to be sulphonated.

FRITZ GÜNTHER.
JOSEF HETZER.